(12) United States Patent
Ganjavian et al.

(10) Patent No.: US 12,702,118 B1
(45) Date of Patent: Aug. 11, 2026

(54) SYSTEMS AND METHODS FOR DISPLAYING TEXT NOTIFICATIONS GENERATED USING NATURAL LANGUAGE PROCESSING MODELS BASED UPON MOTION DATA CAPTURED BY SENSOR PLATFORMS

(71) Applicant: MOGGIE LTD, London (GB)

(72) Inventors: Ali Ganjavian, London (GB); Fernando Key Portilla Kawamura, Basel (CH); Pablo Carrascal, Madrid (ES); Iñigo Javier Puente Henales, Madrid (ES); Anatoli Arkhipenko, New York, NY (US)

(73) Assignee: MOGGIE LTD, London (GB)

( * ) Notice: Subject to any disclaimer, the term of this patent is extended or adjusted under 35 U.S.C. 154(b) by 0 days.

(21) Appl. No.: 18/981,397

(22) Filed: Dec. 13, 2024

Related U.S. Application Data

(60) Provisional application No. 63/611,510, filed on Dec. 18, 2023.

(51) Int. Cl.
*A01K 29/00* (2006.01)
*A01K 27/00* (2006.01)
*H04W 4/12* (2009.01)

(52) U.S. Cl.
CPC .......... *A01K 29/005* (2013.01); *A01K 27/001* (2013.01); *H04W 4/12* (2013.01)

(58) Field of Classification Search
CPC .. A01K 29/005; A01K 29/009; A01K 27/001; H04W 4/12; G06F 1/3231; G06Q 10/06315; G06Q 10/04
See application file for complete search history.

(56) References Cited

U.S. PATENT DOCUMENTS 9,807,981 B2 * 11/2017 Berckmans .............. A01K 5/02
10,154,655 B2 * 12/2018 Schab .................... G08B 25/08
10,349,631 B2 * 7/2019 Bonge, Jr. ............... G01S 19/16
10,986,817 B2 * 4/2021 Singh ................... A01K 11/004
11,475,379 B2 * 10/2022 Khan .................. G06V 10/764
11,747,821 B1 * 9/2023 Clise ................... H04L 12/2803 700/228
12,036,948 B2 * 7/2024 Mai ......................... B60R 25/31
12,063,910 B2 * 8/2024 Mott .................... A01K 27/001
2015/0164430 A1 * 6/2015 Hu ......................... A61B 5/681 600/595
2016/0050888 A1 * 2/2016 Berckmans ............ A01K 39/02 119/51.01

(Continued)

*Primary Examiner* — Hoi C Lau
(74) *Attorney, Agent, or Firm* — KPPB LLP

(57) ABSTRACT

Systems and methods for activity monitoring in accordance with embodiments of the invention are illustrated. One embodiment includes a pet activity monitoring system, including a sensor platform including an inertial measurement unit configured to record time-series motion data, and a fastening device for attaching the sensor platform to a collar, a user device includes a display, and a server, configured to receive the time-series motion data generated by the sensor platform, classify the time-series motion data as pertaining to an activity type of an animal, generate a message based on the activity type using a natural language processing model, and push the message to the user device, where the user device is configured to display the message using the display.

20 Claims, 9 Drawing Sheets

(56) References Cited

U.S. PATENT DOCUMENTS

2018/0263220 A1* 9/2018 Schab .................... G06N 5/048
2019/0053470 A1* 2/2019 Singh ................... A01K 11/004
2019/0059338 A1* 2/2019 Schab .................... G08B 25/08
2019/0146077 A1* 5/2019 Kravets ................ H04B 17/391
455/67.11
2019/0166802 A1* 6/2019 Seltzer ................. A01K 27/001
2020/0289028 A1* 9/2020 Oumnia ............... A61B 5/6807
2020/0333421 A1* 10/2020 Perkins .................. G04G 21/04
2020/0337162 A1* 10/2020 Perkins .................. G04G 21/04
2020/0406860 A1* 12/2020 Mai ......................... B60R 25/31
2021/0212294 A1* 7/2021 Singh ................... A01K 11/004
2021/0374640 A1* 12/2021 Khan ..................... G06V 20/00
2022/0003831 A1* 1/2022 de Jong .................. A45F 5/021
2022/0005337 A1* 1/2022 Shin ..................... G08B 21/043
2022/0151207 A1* 5/2022 Mott ..................... G06F 1/3231
2023/0102979 A1* 3/2023 Kozonoi .............. A01K 29/005
340/573.3
2023/0276773 A1* 9/2023 Benjamin .............. G06V 40/10
340/573.3
2023/0290270 A1* 9/2023 Temple .................... G09B 5/02
2024/0000045 A1* 1/2024 Galvin ................. G06Q 10/063
2024/0057894 A1* 2/2024 Srivastava ............. G16H 40/67
2025/0212844 A1* 7/2025 Filipowicz ............. G16H 20/30

* cited by examiner

SYSTEMS AND METHODS FOR DISPLAYING TEXT NOTIFICATIONS GENERATED USING NATURAL LANGUAGE PROCESSING MODELS BASED UPON MOTION DATA CAPTURED BY SENSOR PLATFORMS

CROSS-REFERENCE TO RELATED APPLICATIONS

The current application claims the benefit of and priority under 35 U.S.C. § 119(e) to U.S. Provisional Patent Application No. 63/611,510 entitled "SYSTEMS AND METHODS FOR DISPLAYING TEXT NOTIFICATIONS GENERATED USING NATURAL LANGUAGE PROCESSING MODELS BASED UPON MOTION DATA CAPTURED BY SENSOR PLATFORMS" filed Dec. 18, 2023. The disclosure of U.S. Provisional Patent Application No. 63/611,510 is hereby incorporated by reference in its entirety for all purposes.

FIELD OF THE INVENTION

The present invention relates generally to the field of messaging systems and more specifically to the use of motion data to generate natural language for inclusion in displayed messages.

BACKGROUND

Activity monitors are utilized in a variety of applications to track movement throughout the day. In many instances, activity monitors communicate with applications on mobile devices that record daily activity. Applications can also provide reminders or alerts that provide information concerning monitored activity.

SUMMARY OF THE INVENTION

Systems and methods for activity monitoring in accordance with embodiments of the invention are illustrated. One embodiment includes a pet activity monitoring system, including a sensor platform including an inertial measurement unit configured to record time-series motion data, and a fastening device for attaching the sensor platform to a collar, a user device includes a display, and a server, configured to receive the time-series motion data generated by the sensor platform, classify the time-series motion data as pertaining to an activity type of an animal, generate a message based on the activity type using a natural language processing model, and push the message to the user device, where the user device is configured to display the message using the display.

In a further embodiment, the server is further configured to continuously aggregate time-series motion data from the sensor platform, classify the aggregated time-series motion data as pertaining to a sequence activity types, and generate the message based on the sequence of activity types.

In still another embodiment, the server is further configured to select the natural language processing model from a plurality of natural language processing models, where each natural language processing model in the plurality of natural language processing models is trained to output text in a different personality.

In a still further embodiment, at least one personality is a veterinarian personality.

In yet another embodiment, at least one personality is a personality type of the animal.

In a yet further embodiment, the natural language processing model is a transformer model, and wherein the activity type is provided to the transformer model as an activity token.

In another additional embodiment, the server is further configured to generate a meme image of the animal based on the activity type and an image of the animal using a generative model.

In a further additional embodiment, the sensor platform further includes a temperature sensor configured to produce time-series temperature data, and wherein the server is further configured to classify the time-series motion data using the time-series temperature data.

In another embodiment again, the method further includes steps for a base station configured to obtain data from the sensor platform and provide the data to the server.

In a further embodiment again, the animal is a cat.

One embodiment includes a pet activity monitoring method, comprising recording time-series motion data using a sensor platform mounted to an animal's collar, where the sensor platform includes an inertial measurement unit configured to generate time-series motion data, receiving the time-series motion data generated by the sensor platform at a server, classifying the time-series motion data as pertaining to an activity type of an animal using a machine learning model of the server, generating a message based on the activity type using a natural language processing model of the server, pushing the message from the server to a user device, and displaying the message using a display of the user device.

In still yet another embodiment, the method further includes steps for continuously aggregating time-series motion data from the sensor platform, classifying the aggregated time-series motion data as pertaining to a sequence activity types, and generating the message based on the sequence of activity types.

In a further embodiment, the method further includes selecting the natural language processing model from a plurality of natural language processing models, where each natural language processing model in the plurality of natural language processing models is trained to output text in a different personality.

In a still yet further embodiment, at least one personality is a veterinarian personality.

In still another additional embodiment, at least one personality is a personality type of the animal.

In a still further additional embodiment, the natural language processing model is a transformer model, and wherein the activity type is provided to the transformer model as an activity token.

In still another embodiment again, the method further includes steps for generating a meme image of the animal based on the activity type and an image of the animal using a generative model of the server.

In a still further embodiment again, the method further includes steps for recording time-series temperature data using a temperature sensor of the sensor platform, and classifying the time-series motion data using the time-series temperature data.

In yet another additional embodiment, the method further includes steps for using a base station to relay data from the sensor platform to the server.

In a yet further additional embodiment, the animal is a cat.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
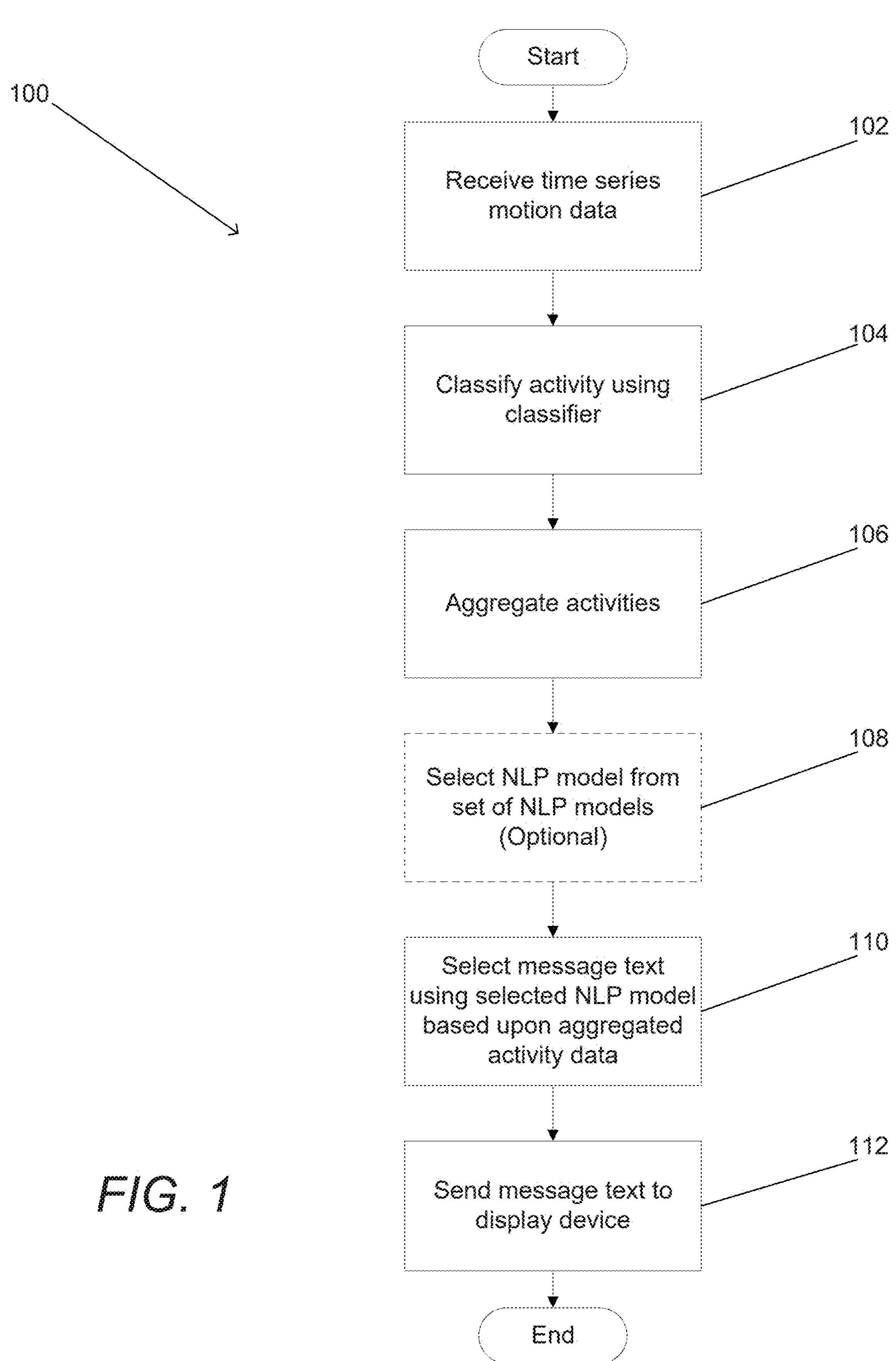
FIG. 1 is a flow chart for an activity monitoring process in accordance with an embodiment of the invention.

Activity monitors can be utilized in a variety of contexts including (but not limited to) the monitoring of people, animals, vehicles and/or goods. In many instances, the information revealed by activity monitoring is ignored by users due to the repetitive nature of the notifications that are generated. The phenomenon is often referred to using terms such as “notification overload”, “reminder fatigue” and “alert fatigue”. Alert fatigue is associated with ineffective monitoring of critical alerts in a variety of contexts including (but not limited to) health care and cybersecurity. In the context of activity monitoring, notification overload has been linked with high rates of attrition in the use of fitness trackers.

Cats present a particularly interesting case for use of activity monitoring. Cats can be independent, which can present a problem when it comes to their health. Cat illnesses often cause a change in a cat’s physical behaviors, which can be difficult to detect. Cats can be very good at hiding illness. As a result, many serious cat ailments are treated too late. For activity monitors to be effective in improving health outcomes for cats, users should continuously monitor alerts so that an infrequent alert associated with a potential illness is not overlooked.

Activity monitoring systems and methods of activity monitoring in accordance with many embodiments of the invention use a natural language processing model to generate text for display in messages based upon inputs derived from motion sensor data. The natural language processing model translates physical movement into natural language. In many embodiments, the natural language processing model selects text to include in a message from a set of candidates generated by a text generation model based upon factors including (but not limited to) activity information. A text generation model, such as (but not limited to) a generative transformer model, can be trained based upon a corpus of training examples that exhibit a particular writing style or personality. By using a natural language processing model that selects messages generated using a text generation model, the text can present information collected through activity monitoring in an engaging manner increasing the likelihood that a user will monitor the alerts. In this way, users are more likely to attend to critical alerts such as (but not limited to) an alert message generated in response to detection of a modification of one or more behaviors indicative of a pet’s illness.

In certain embodiments, motion data is collected using one or more motion sensors. A time sequence of the collected motion data can be provided to a classifier that is trained to detect the occurrence of one or more activities. In a number of embodiments, detected activities are aggregated in a database of activity data and a notification generator can periodically query the database of activity data to retrieve information regarding recent activity. The retrieved information regarding recent activity can then be provided as an input to a natural language processing model trained to select natural language text based upon activity information.

In several embodiments, the natural language processing model is selected from a number of natural language processing model that are each trained on a different training corpus. In this way, the characteristics of the generated message can be influenced through the selection of the natural language processing model. For example, different natural language processing models can each be trained on a corpus reflecting a particular personality type or emotional state. In a number of embodiments, the selection of the natural language processing model is based upon a user input. In many embodiments, the selection is based upon retrieved activity data including (but not limited to) the information regarding recent activity. In various embodiments, recent activity is not limited to recent recorded motion, but extends to previous generated text and other historical data.

Natural language text generated in accordance with various embodiments of the invention can be formatted into a message that is displayed to a user via an interactive user interface. Text inputs received via the interactive user interface can be utilized as inputs to the selected natural language processing model to generate natural language text responsive to the user input. The generated natural language responses can then be formatted into a further message that is displayed to the user via the interactive user interface. In this way, a user can engage in an interactive chat session in which the generated text is influenced by information collected by an activity monitor.

In many embodiments, an activity monitoring system is capable of controlling the frequency of messages to avoid notification fatigue. In several embodiments, the user can specify the frequency with which the user wishes to receive alerts. In a number of embodiments, the activity monitoring system monitors engagement with notifications (e.g. the App is opened, the message is liked, the user replies to the message) and modifies the frequency with which messages are generated for display to a user based upon the monitored engagement. In certain embodiments, the activity monitoring system adjusts the frequency with which messages are generated for display to a user based upon an objective such as (but not limited to) maximizing user engagement with the activity monitoring system. In addition to frequency, the modality of communication can be modulated over time in order to increase engagement. For example, the activity monitoring system may select from images, diagrams, videos, and/or audio (e.g. vocalized speech) in addition to text. In some embodiments, generative models can be used to generate additional content based on recorded activity. In some embodiments, period summaries of activity are provided, e.g. daily/weekly/monthly/etc. summaries.

Activity monitoring systems and methods for using a natural language processing model to generate text for display in messages based upon inputs derived from sensor data such as, but not limited to, motion sensor data in accordance with embodiments of the invention are discussed further below. While systems and methods in accordance with certain embodiments of the invention can be advantageously utilized in the activity monitoring of cats, it should be appreciated that systems and methods in accordance with various embodiments of the invention are not limited to activity monitoring of animals, but are capable of use in a variety of applications including (but not limited to) the monitoring of people, animals, vehicles and/or goods.

Activity Monitoring Systems

Activity monitoring systems in accordance with various embodiments of the invention typically include a sensor platform incorporating one or more motion sensors. In several embodiments, the sensor platform can include an Inertial Measurement Unit (IMU) including one or more linear accelerometers and one or more gyroscopes. In certain embodiments, the sensor platform also includes one or more environmental sensors such as (but not limited to a thermometer). The sensor platform can communicate via a wireless communication link with a base station that, in turn, transmits messages over a network to a server system that processes the motion data, uses a machine learning model to classify the corresponding activity from the data captured by the sensor platform, and generates message text for display using a natural language processing (NLP) model.

A process that can be utilized by a server system, which forms part of an activity monitoring system, to generate messages based upon inputs derived from motion sensor data in accordance with an embodiment of the invention is illustrated in FIG. 1. The process 100 includes receiving (102) time series motion data. The time series motion data can then be analyzed (104) by one or more classifiers.

In several embodiments, the one or more classifiers are trained using supervised learning to detect the occurrence of one or more different activities. In certain embodiments, the classifier is a deep learning model such as (but not limited to) a Long-Short Term Memory (LSTM) network. In a number of embodiments, the LSTM network is trained using a supervised learning process in which expert annotators provide annotations to time series motion data based upon observation of one of a number of activities. As can be readily appreciated, the resulting annotated time series motion data set can be used as an annotated training data set to train any of a variety of machine learning models using any of a variety of supervised learning techniques appropriate to the requirements of a specific application. Accordingly, it should be readily appreciated that embodiments of the invention are not limited to any specific machine learning model or training technique.

Referring again to the process 100 shown in FIG. 1, the process aggregates (106) activities. In several embodiments, classified activities are stored within a database to enable retrieval for subsequent use and/or analysis. In many embodiments, the process uses the aggregated activity data to generate messages displayed to a user via a user interface on a user device.

In a number of embodiments, the process is capable of utilizing one of set of different NLP models to generate messages with a particular stylistic voice or personality. Customization of the messages to a particular user (through the choice of NLP model used to generate the message) can results in messages that are more engaging to the user. In several embodiments, the process 100 selects (108) an NLP model from the set of NLP models. In certain embodiments, the selection of the NLP model is based upon a user input. For example, in the context of activity monitoring of cats the user could indicate a personality type or "catitude" of their cat and the process can select an NLP model trained to generate messages and/or select between previously generated messages reflecting their cat's selected personality type. In numerous embodiments, generated text can be vocalized using a selected auditory voice matched to the stylistic voice. In some embodiments, the auditory voice is made to sound male or female depending on the sex of the cat, although this may be modified by the user.

In many embodiments, the NLP model is trained to select between previously generated messages that were generated by a text generation model such as (but not limited to) a generative transformer. In a number of embodiments, the generative transformer is trained using a corpus that is curated to have a specific characteristic or personality. The training can involve training of all layers of generative pre-trained transformer or can fix one or more of the layers of a pre-trained transformer and allow adjustment of the parameters in one or more of the remaining layers. As can readily be appreciated, any of a variety of text generation models and/or approaches to training a set of text generation models to generate sets of candidate messages exhibiting different stylistic characteristics can be utilized as appropriate to the requirements of specific applications. In several embodiments, the selection of the NLP model is based at least in part on recent activity data. For example, in the context of activity monitoring of cats a first NLP model can be selected when a "resting" activity is detected and a second NLP model can be selected when a "playing" activity is detected. In many embodiments, the process 100 does not perform a selection of an NLP model (e.g. the process utilizes a single NLP model). The NLP model can be used to select and/or generate (110) message text based upon aggregated activity data and the message text can be sent (112) to a user device for display. In certain embodiments, a server system implementing the process pushes the message as a notification to one or more user devices for display. In a number of embodiments, the user device can pull notifications from a server system implementing the process. As can readily be appreciated, any of a variety of techniques that can be utilized to transmit messages from a server system to a device for display can be utilized as appropriate to the requirements of specification applications in accordance with various embodiments of the invention.

While various processes for generating messages based upon inputs derived from motion sensor data are described above with reference to FIG. 1, any of a variety of processes that utilize an NLP model that can generate text based upon motion data, time series motion data, activity data and/or aggregated activity data can be utilized as appropriate to the requirements of specific applications can be utilized in accordance with various embodiments of the invention. For example, in numerous embodiments, NLP models are large language models that can be queried produce text based on classified activity. In some embodiments, the large language model is a transformer that incorporates tokens associated with activity states which can be provided as part of the input vector to generate text associated with specified input activity. In a variety of embodiments, a multimodal transformer model is used that can accept tokenized sensor data in order to generate text associated with activity described by the sensor data, rather than using a machine learning classifier to identify the activity from the sensor data. Similarly, the large language model can be provided with one or more tokens indicating the personality the output text should match.

In order to further illustrate the various processes that can be utilized to generate messages using one or more NLP models based upon inputs derived from motion sensor data in accordance with various embodiments of the invention, specific implementations are discussed below in the context of activity monitoring of cats. As noted previously, the systems and methods described herein should be understood as not limited to use in the activity monitoring of cats and the discussion of the activity monitoring for cats, while describing an important use case, is for illustrative purposes only.

Activity Monitoring of Cats

Figure 2:
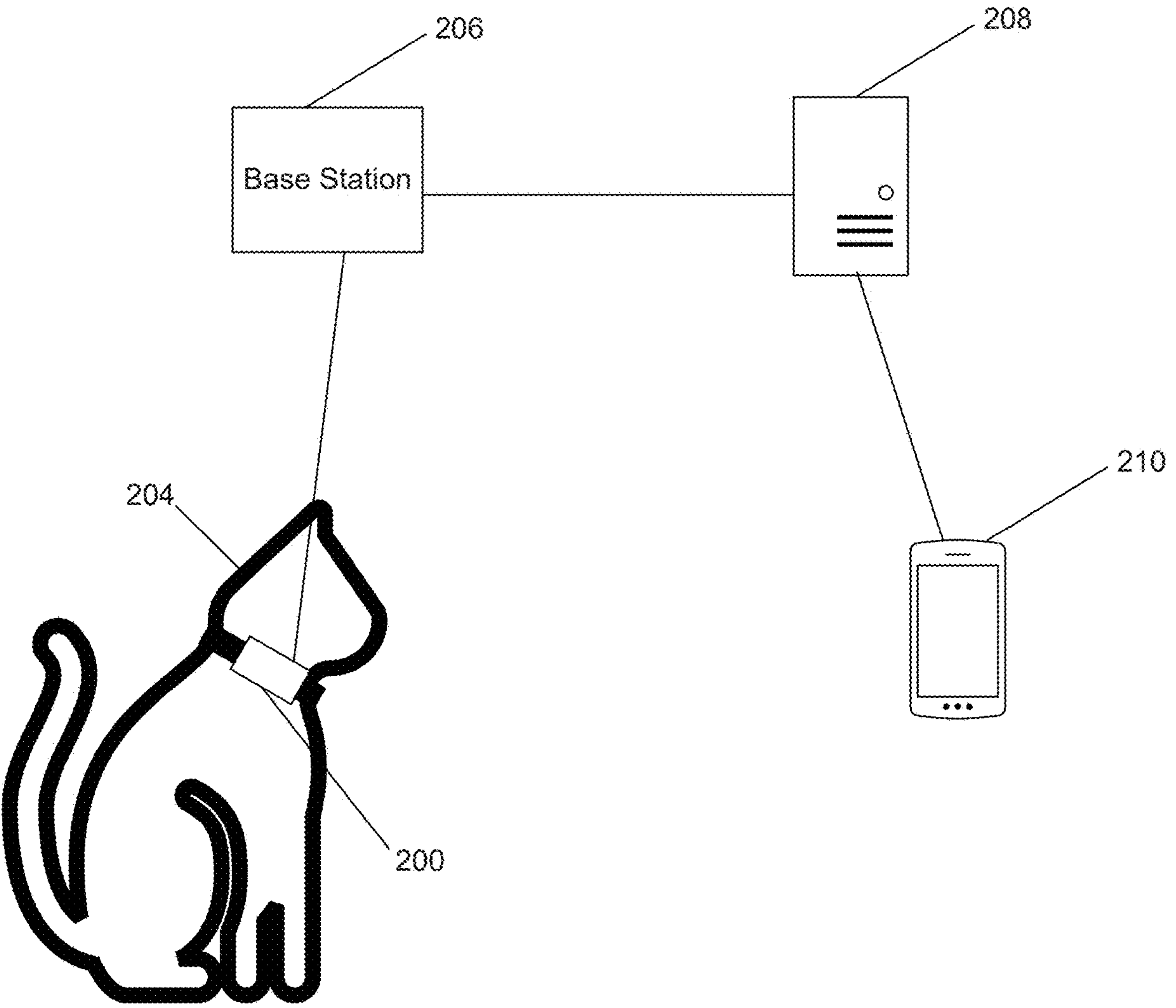
FIG. 2 illustrates an activity monitoring system for a cat in accordance with an embodiment of the invention.

A specific example of an activity monitoring system for a cat that is implemented in accordance with an embodiment of the invention is illustrated in FIG. 2. In the illustrated embodiment, the senor platform 200 is mounted to a collar 202. In many embodiments, the sensor platform is mounted using a fastening device such as (but not limited to) loops through which a collar can pass through, hook-and-loop fasteners, rivets, snaps, and/or any other fastening device as appropriate to the requirements of specific applications of embodiments of the invention. In several embodiments, the sensor platform is an IMU that includes a temperature sensor. As can readily be appreciated, the specific sensor included within the sensor platform are only limited by the requirements of the specific application (e.g. form factor, power budget, and/or data capture requirements). The collar 202 can be affixed to a cat 204 and the sensor platform 200 then proceeds to collect time series motion data as the cat 204 moves.

A base station 206 is capable of communicating with the sensor platform 200. In this way, the sensor platform 200 can transmit motion data to the base station. In several embodiments, the motion data is raw time series motion data captured by the sensors within the sensor platform. In a number of embodiments, the sensor platform processes the raw time series motion data and provides a time series of processed motion data. In many embodiments, the data received by the base station is treated as time series motion data (irrespective of whether it is raw sensor data or has been processed). Time series motion data received by the base station 206 can be forwarded to a remote server system 208 for processing. Server system 208 can push outputs to a user device 210 for display via a user interface.

Figure 3:
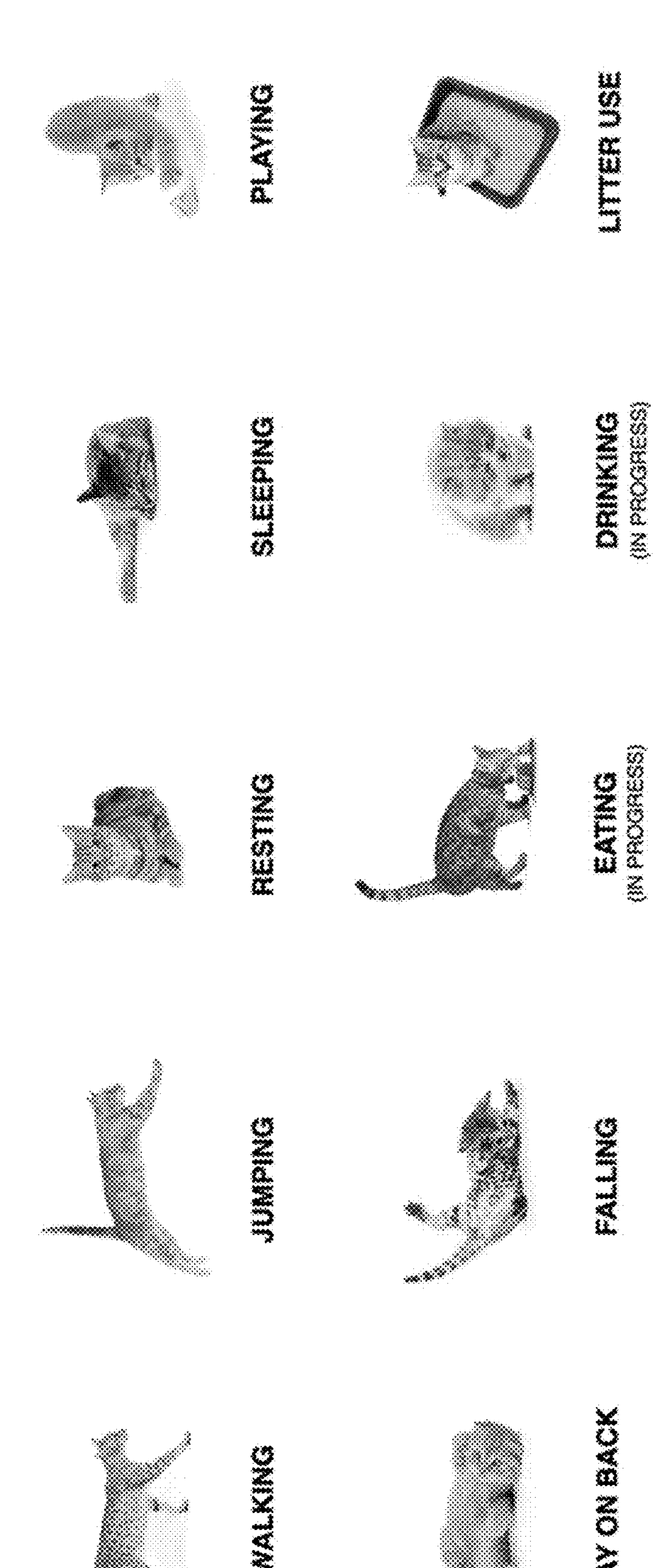
FIG. 3 illustrates a number of different activity types for a cat in accordance with an embodiment of the invention.
Figure 3:
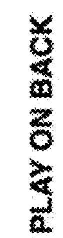

As discussed above, a server system within an activity monitoring system can utilize a classifier, such as (but not limited to) any of the classifiers described above with reference to FIG. 1, to detect the occurrence of one or more activities based upon received time series motion data. Examples of activities that may be relevant to the monitoring of the health of a cat are conceptually illustrated in FIG. 3. In a number of embodiments, the server system utilizes at least one classifier that is capable of detecting at least one of the activities shown in FIG. 3. In other embodiments, any number and/or variety of classifiers can be utilized as appropriate to the requirements of specific applications (e.g. the specific activities being detected and/or the specific sensor platform). When the server system detects an activity, the detected activity can be used to generate a message using an NLP model and/or aggregated within an activity database. In a number of embodiments, aggregated activity information can be used to generate a message using an NLP model. In many embodiments, the server system performs one of the processes described above with reference to FIG. 1 to detect an activity and send message text for display based upon aggregated activity information.

In several embodiments, the activity monitoring system includes a software application that can be installed upon a user device such as (but not limited to) a mobile phone. The software application can display a user interface that displays information concerning the cat's activity and/or messages generated by the server system. The application can include a variety of user interface contexts that display different categories of information generated by the activity monitoring system based upon motion data. Examples of various user interfaces that can be incorporated within an application in accordance with various embodiments of the invention are discussed further below with reference to FIGS. 4-10.

While specific activity monitoring systems and system components are described above with reference to FIG. 2, any of a variety of activity monitoring systems can be utilized to monitor cat activity as appropriate to the requirements of specific applications in accordance with various embodiments of the invention. Furthermore, activity monitoring systems similar to the system described above with reference to FIG. 2 can be utilized in the monitoring of other animals including (but not limited to) dogs and livestock.

User Engagement Through Interactive Messaging

Notification fatigue can cause users to ignore important messages generated by activity monitoring system. When messages generated by an activity monitoring system relate to the health of a patient or a beloved companion animal, the messages should not be ignored. Activity monitoring systems in accordance with many embodiments of the invention create increased user engagement with notifications by presenting notifications in the voice of the person, animal, or object being monitored. In the context of companion animals such as (but not limited to) a cat or a dog, activity monitoring systems in accordance with many embodiments of the invention can prompt users (e.g. via a user interface within a software application) to provide information concerning the personality of their companion animals. The activity monitoring system can then select and/or generate messages for a specific companion animal using an NLP model trained to select and/or generate natural language having the personality identified by the user monitoring the activity of the companion animal. Examples of messages generated in this manner are conceptually illustrated via the user interface renderings shown in FIGS. 4-10.

Figure 4:
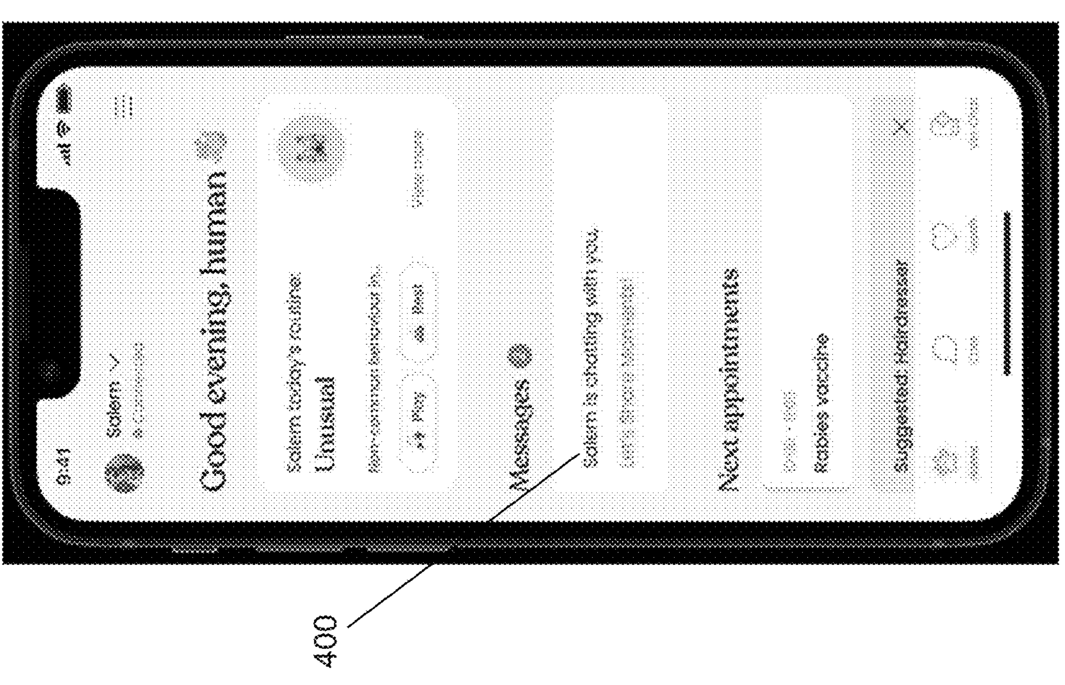
FIG. 4 illustrates a user interface element for starting an activity monitoring interaction in accordance with an embodiment of the invention.
Figure 7:
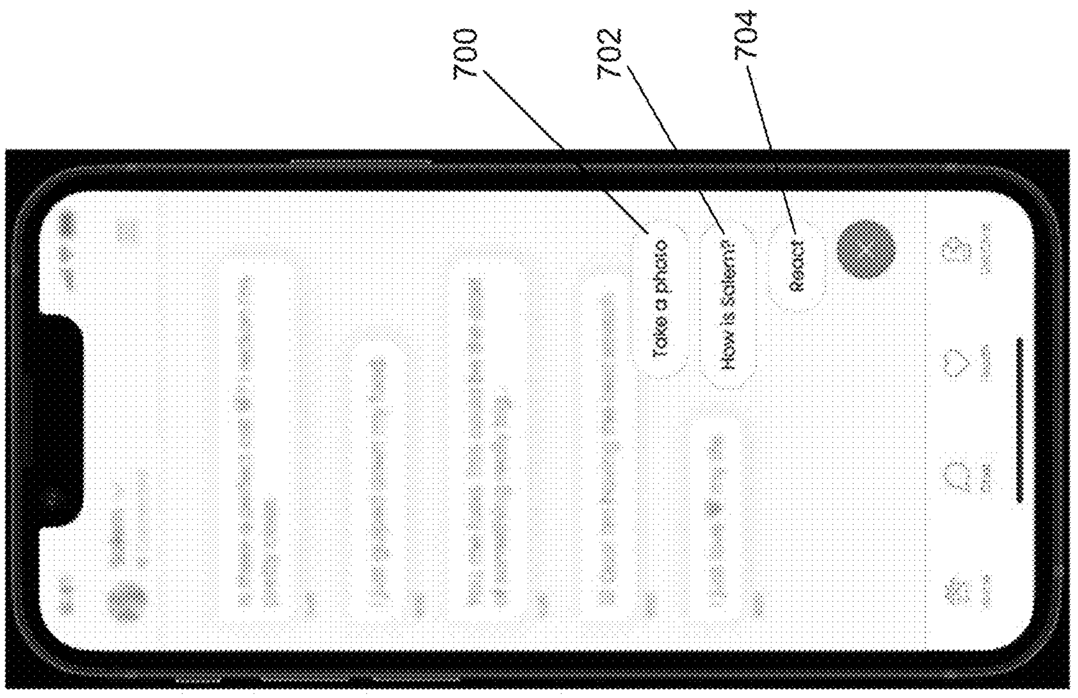
FIG. 7 illustrates a user interface providing interaction options in accordance with an embodiment of the invention.

Referring first to FIG. 4, a user interface component 400 indicates that "Salem" (i.e. the cat being monitored) has sent a message to the user ("Salem is chatting with you"). The specific message is an invitation to interact ("Let's share moments"). In many embodiments, a chat window can be generated in which the user can receive messages describing the activity of the cat as if written by the cat. In many embodiments, the user has an opportunity to reply.

Figure 5:
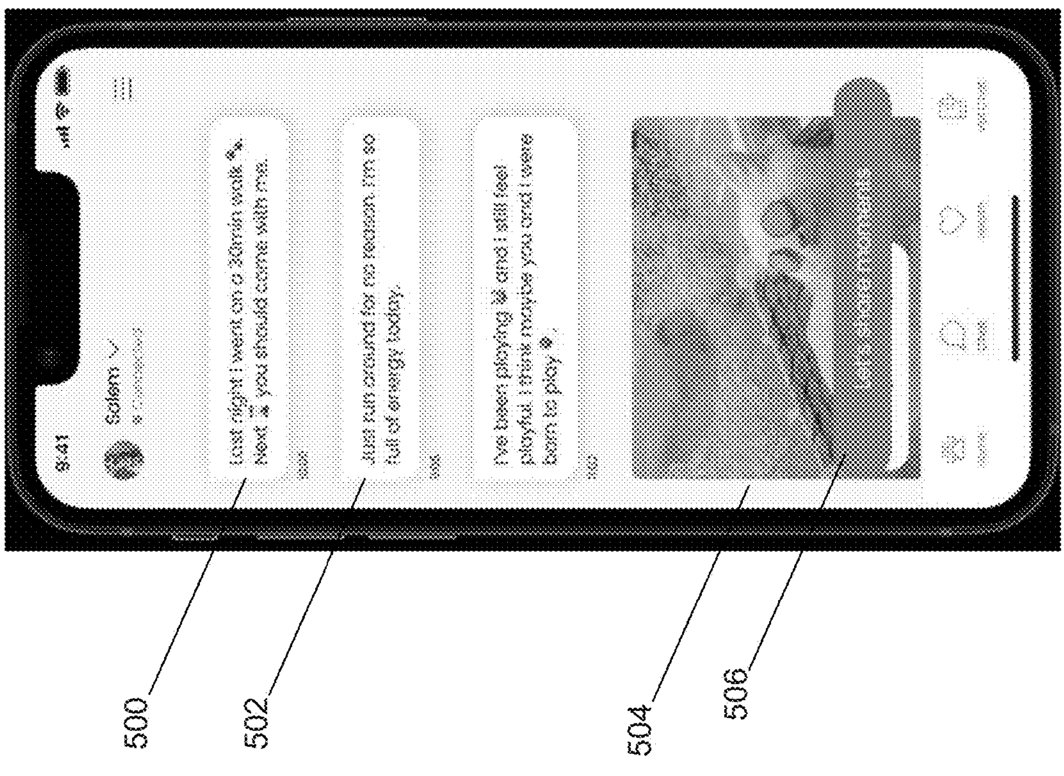
FIG. 5 illustrates a user interface for a chat session purporting to be with a cat being monitored.
Figure 5:

The user interface conceptually illustrated in FIG. 5 conceptually illustrates a chat session purporting to be with the cat being monitored. A first message 500 was generated by the activity monitoring system based upon aggregated activity data ("Last night I went on a 30 min walk [alone]. Next [time] you should come with me."). Similarly, a second message 502 was also generated based upon activity data ("Just run around for no reason. I'm so full of energy today."). A third message 504 contains a "meme" that was generated in response to aggregated activity data. As can be appreciated, content can be generated by the activity monitoring system that is not text. Image or video memes can be generated using generative machine learning models. In some embodiments, uploaded images of the user's cat can be used to generate image or video content that depicts the user's animal. A fourth message 506 invites the user to interact ("Let's share moments") and contains a button that can be selected by the user to initiate the interaction. A similar user interface to the user interface conceptually illustrated in FIG. 5 is conceptually illustrated in FIG. 6 showing an additional set of messages generated by the activity monitoring system and purporting to be from "Salem" and a button 600 similar to the button shown in FIG. 5 and inviting the user interact ("Let's share moments").

Figure 6:
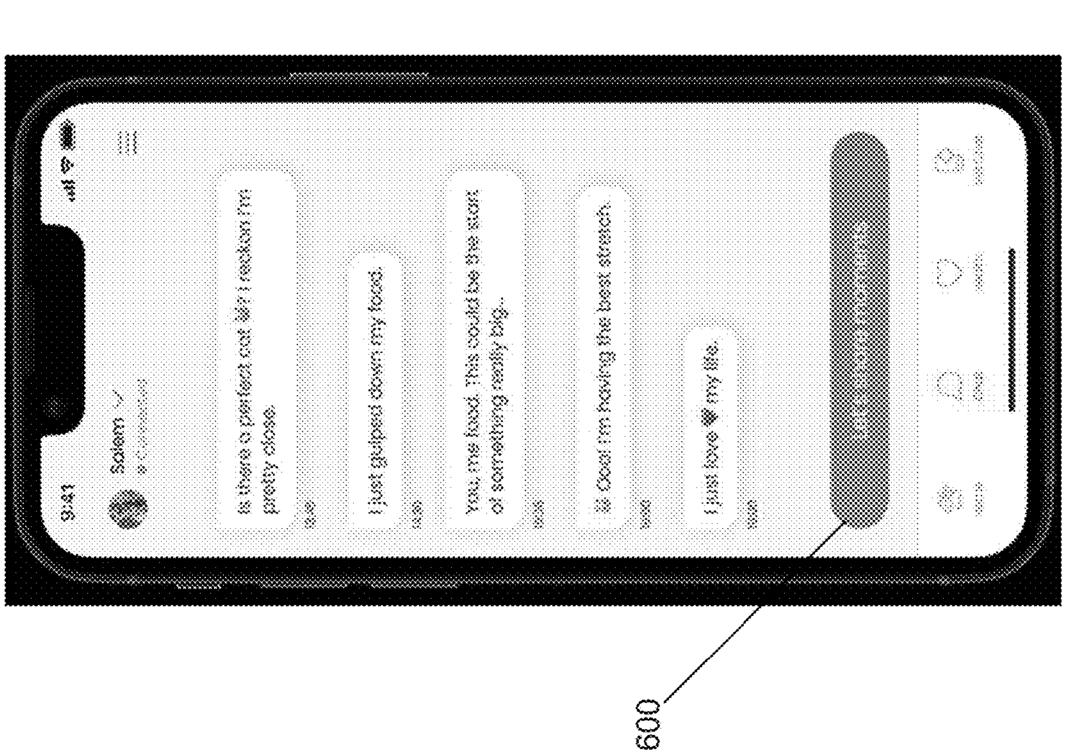
FIG. 6 illustrates a user interface providing an invitation to interact in accordance with an embodiment of the invention.
Figure 9:
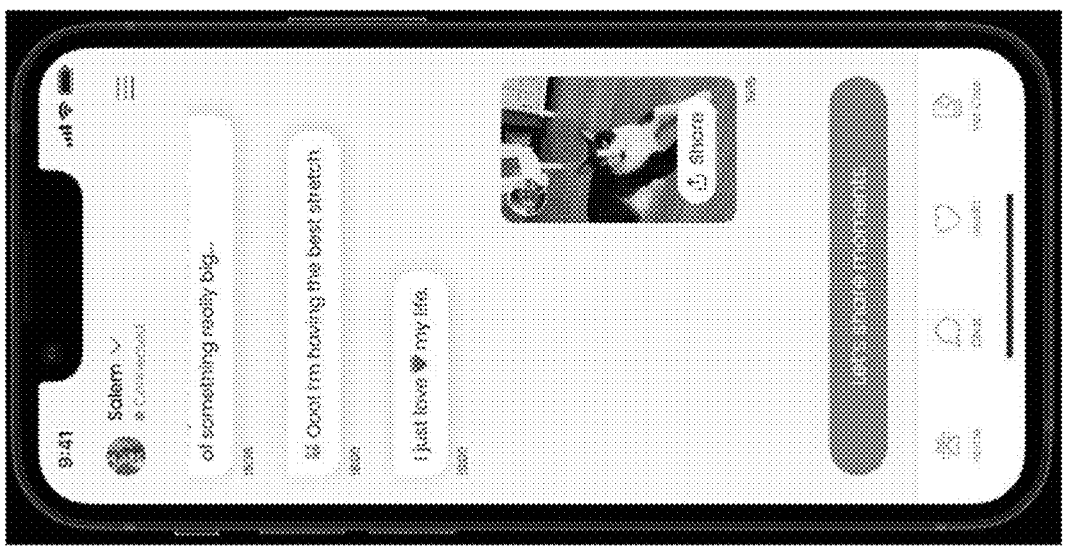
FIG. 9 illustrates a user interface with an uploaded photo integrated into the chat in accordance with an embodiment of the invention.
Figure 9:
Figure 8:
FIG. 8 illustrates a user interface for taking a photo in accordance with an embodiment of the invention.

When the user chooses to interact with the software application and selects the button 600 shown in FIG. 6, the user interface can provide one or more options for interacting with the activity monitoring platform. A user interface displaying three options for interacting with the activity monitoring platform is conceptually illustrated in FIG. 7. A first option 700 suggests "take a photo", which can trigger a user interface flow similar to the user interfaces conceptually illustrated in FIGS. 8 and 9. A similar interface can be provided where a user is prompted to "take a video". In this way, the activity monitoring system can request additional image-based content for use in generating new content. A second option 702 suggests that the user engage in an interactive chat session with the activity monitoring system to learn information concerning the cat being monitored ("How is Salem?"). A third option prompts the user to send a reaction ("React"). By using aggregated activity data to generate the text of a message using an NLP model that convey information regarding the activity and/or health of the monitored cat ("Salem"), the activity monitoring system can provide notification in a manner that is more likely to engage the user. In the illustrated embodiment, the user experience of receiving notifications is more akin to simulating conversational text messaging with the monitored cat. The resulting experience is much more likely to be engaging compared to receiving repetitive notifications that have similar content (e.g. activity data inserted within a text template).

Figure 10:
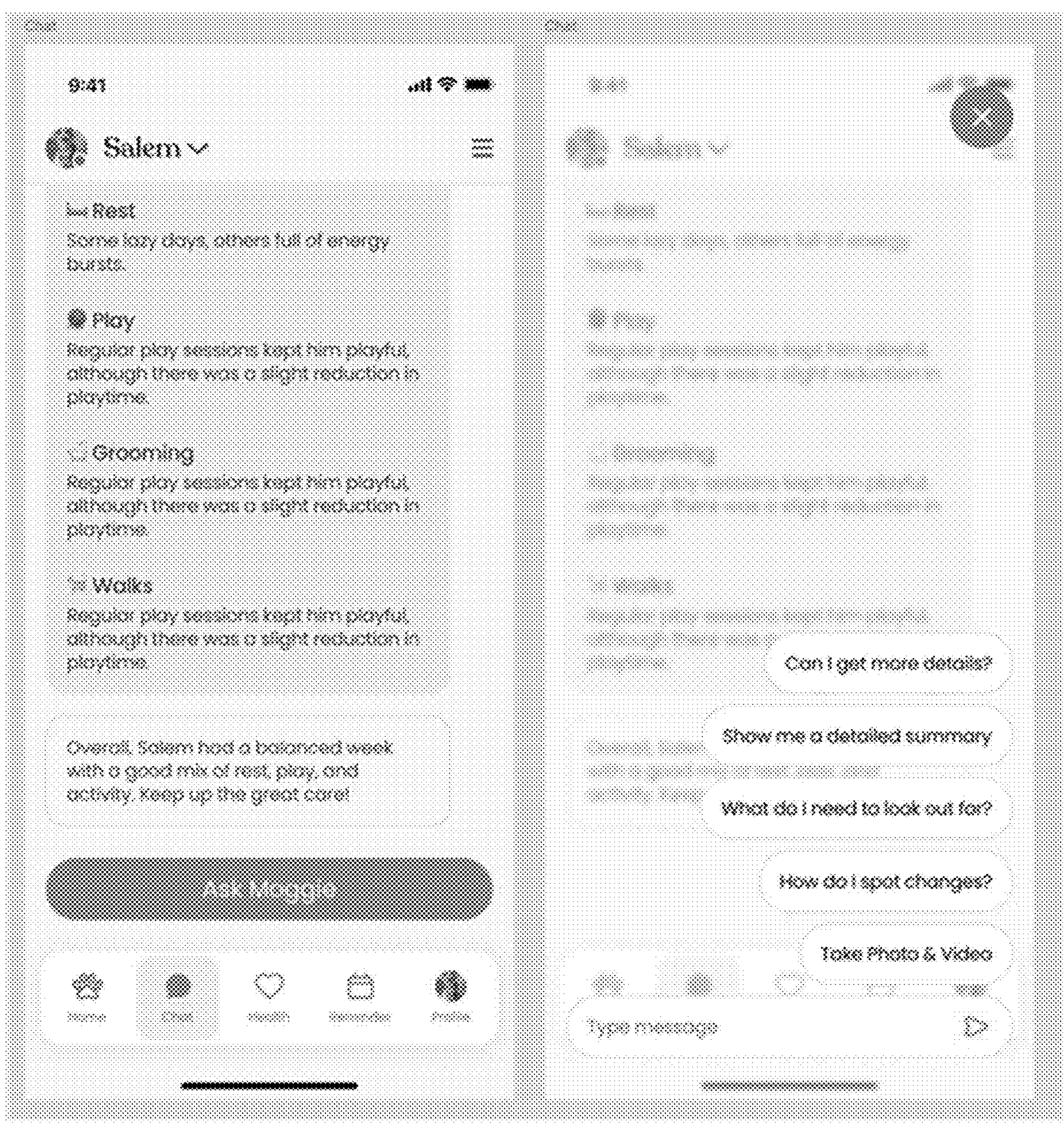
FIG. 10 illustrates a user interface for providing an interactive activity summary in accordance with an embodiment of the invention.

An additional interface is shown in FIG. 10 which illustrates a weekly summary with which a user can interact. In many embodiments, user queries can be immediately responded to using pre-generated responses and/or generated on the fly using a generative model.

While specific user interfaces are conceptually illustrated in FIGS. 4-10, any of a variety of user interfaces can be utilized by an activity monitoring system to interact with a user as appropriate to the requirements of specific applications in accordance with various embodiments of the invention. For example, instead of generating communications from the perspective of the cat, the system may generate communications from the perspective of a veterinarian observing the cat. Further, as can be readily appreciated, while the above is discussed in the context of a cat, similar approaches can be applied to any arbitrary animal without departing from the scope or spirit of the invention.

Activity Monitoring Server Systems

Activity monitoring systems in accordance with a variety of embodiments of the invention utilize a server system to process received motion data to generate inputs to an NLP model configured to generate messages. A variety of server system architectures can be utilized as appropriate to the requirements of specific applications.

Figure 11:
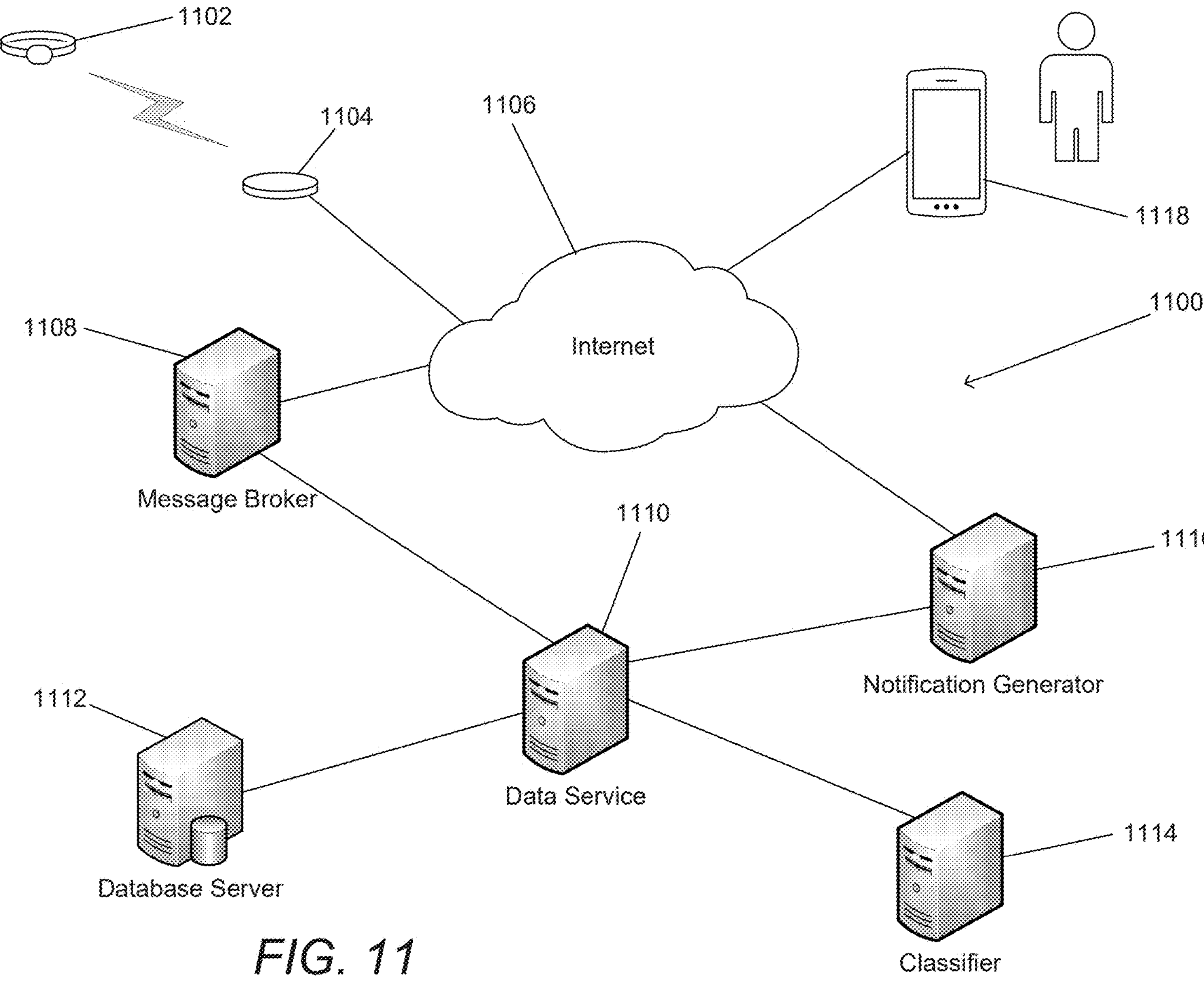
FIG. 11 is a system diagram for an activity monitoring system in accordance with an embodiment of the invention.

An activity monitoring system incorporating a server system that is capable of implementing processes including (but not limited to) any of the activity monitoring processes described above with respect to FIG. 1 is conceptually illustrated in FIG. 11. The activity monitoring system 1100 includes a sensor platform 1102 that communicates with a base station 1104. While the sensor platform 1102 is shown as communicating with the base station 1104 via a wireless link, sensor platforms in accordance with many embodiments of the invention transfer data in a batch process when the sensor platform is docked with a connector in the base station. In several embodiments, the sensor platform is capable of communicating directly with the server system (e.g. via a wireless connection to the Internet) and a base station is not a required component of the activity monitoring system. The base station 1104 is capable of communicating with a server system associated with the activity monitoring system via the Internet.

In the illustrated embodiment, the server system is implemented via a number of individual server applications including a message broker 108, a data service 1110, a database server 1112, a classifier 1114, and a notification generator 1116. The individual server applications can be executing on the same server, different servers, and/or utilizing virtualization so that each of the individual server applications is executing within a dedicated virtual machine.

In several embodiments, the message broker 1108 is capable of receiving messages from the base station 1104 via the Internet 1106. The message broker 1108 provides messages including messages containing activity data such as (but not limited to) time series motion data to the data service 1110. In a number of embodiments, the data service 1110 provides the time series motion data to the database server 1112 for archival storage. In certain embodiments, the data service 1110 provides the time series motion data to the classifier 1114. The classifier 1114 can determine whether the time series motion data is indicative of an activity and/or the nature of the detected activity. The classifier 1114 can perform the classification using a machine learning model trained to detect activities from time series motion data such as (but not limited to) any of the machine learning models discussed above with respect to FIG. 1.

Referring again to FIG. 11, the data service 1110 receives detected activities from the classifier 1114 and can provide the detected activities to the database server 1112. In several embodiments, the database server 1112 associates the detected activity with the underlying time series motion data that formed the basis of the classification. In a number of embodiments, the database server 1112 updates aggregations of activity data to reflect the newly detected activity. For example, the detection of a new type of activity may cause the database server to update a count of the frequency of occurrence of the detected activity (e.g. the number of times a cat has eaten that day) and/or to determine the duration of a previous activity (e.g. detection of playing after a period of rest can cause the database server to determine the duration of the period of rest). As can readily be appreciated, the information aggregated by a database server 1112 is largely only limited by the available activity data and the requirements of specific applications.

At intervals, the server system can generate a message that is transmitted to the user. In several embodiments, the data service 1110 initiates the selection and/or generation of a message to send to the user by requesting that the notification generator 1116 send a message to a device 1118 associated with a user account. In many instances, the data service 1110 queries the database server and provides relevant activity information and/or aggregated activity information to the notification generator 1116. In several embodiments, the notification generator 1116 selects an NLP model from a number of NLP models and uses the selected NLP model to generate and/or select message text. The selected message text can be selected based upon activity data including (but not limited to) aggregated activity data. The selected message text can also be selected to solicit engagement with the activity monitoring system from the user. As can readily be appreciated, the specific criteria utilized by the NLP model to generator and/or select the message text are largely dependent upon the requirements of a specific application. The notification generator 1116 can then send a message including the message text to a device 1118 associated with a specific user account. In a number of embodiments, the notification is sent via a push notification. In certain embodiments, the notification can be retrieved (pulled) by the user device.

The user can then view the received message via a user interface. In several embodiments, the user interface can be provided by a software application installed on the user device and/or a user interface rendered via a web browser. As described above with reference to FIGS. 4-10 additional user interfaces can be provided to enable an interactive chat session between the user and the activity monitoring system.

Figure 12:
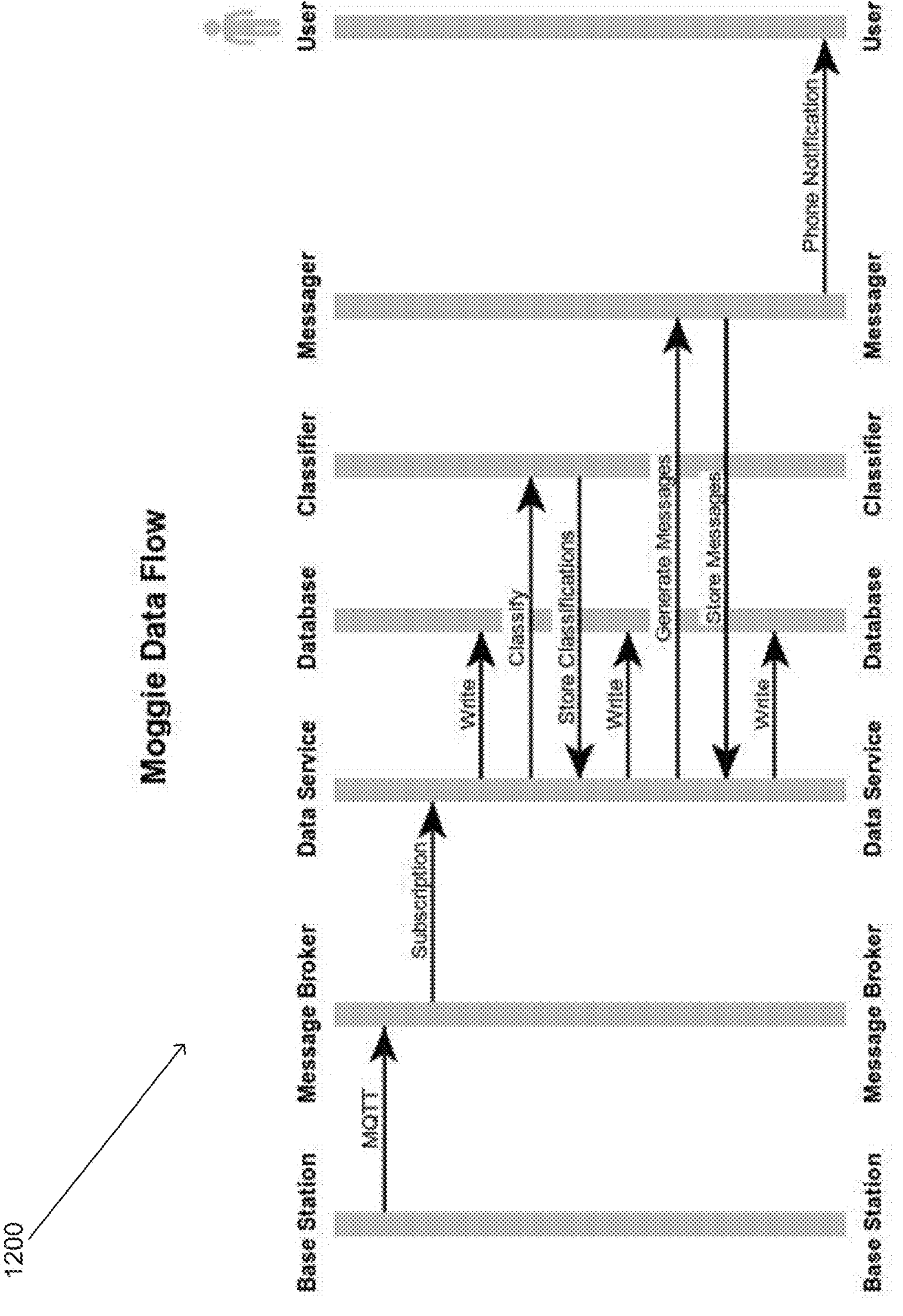
FIG. 12 is a data flow diagram for an activity monitoring system in accordance with an embodiment of the invention.

Communications that can occur between a base station, and the individual servers within the server system shown in FIG. 11, that result in the generation of a message based upon captured time series motion data are conceptually illustrated within the data flow diagram illustrated in FIG. 12. In the illustrated data flow 1200, the base station sends time series motion data to a message broker. The data service subscribes to a feed from the message broker and causes the received time series motion data to be written to a database of time series motion data. The data service requests that the classifier provide a classification of any activities that can be detected from the time series motion data and causes any classifications to be stored within the database. When the data service determines that a notification is required to be sent to the user (e.g. to increase engagement with the activity monitoring system or due to an important development), the data store causes a message service to generate a message that is sent to a user device associated with a specific user account. The data service also causes the message to be written to the database.

While specific activity monitoring system implementations are discussed above with respect to FIGS. 11 and 12, including activity monitoring systems that include multiple individual server systems and/or that implement the process shown in FIG. 1, any of a variety of activity monitoring system configurations can be utilized as appropriate to the requirements of specific applications in accordance with various embodiments of the invention. For example, processes described as being performed by the server system can be performed on the base station and/or on a user device. Furthermore, the sensor platform can communicate directly with the server system and/or the user device eliminating the need for base station and/or the server system.

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described.

What is claimed is:

1. A pet activity monitoring system, comprising:
a sensor platform comprising:
an inertial measurement unit configured to record time-series motion data; and
a fastening device for attaching the sensor platform to a collar;
a user device comprising a display; and
a server, configured to:
receive the time-series motion data generated by the sensor platform;
classify the time-series motion data as pertaining to an activity type of an animal;
generate a message based on the activity type using a natural language processing model; and
push the message to the user device;
where the user device is configured to display the message using the display.

2. The activity monitoring system of claim 1, wherein the server is further configured to:
continuously aggregate time-series motion data from the sensor platform;
classify the aggregated time-series motion data as pertaining to a sequence activity types; and
generate the message based on the sequence of activity types.

3. The activity monitoring system of claim 1, wherein the server is further configured to select the natural language processing model from a plurality of natural language processing models, where each natural language processing model in the plurality of natural language processing models is trained to output text in a different personality.

4. The activity monitoring system of claim 1, wherein at least one personality is a veterinarian personality.

5. The activity monitoring system of claim 1, wherein at least one personality is a personality type of the animal.

6. The activity monitoring system of claim 1, wherein the natural language processing model is a transformer model, and wherein the activity type is provided to the transformer model as an activity token.

7. The activity monitoring system of claim 1, wherein the server is further configured to generate a meme image of the animal based on the activity type and an image of the animal using a generative model.

8. The activity monitoring system of claim 1, wherein the sensor platform further comprises a temperature sensor configured to produce time-series temperature data; and
wherein the server is further configured to classify the time-series motion data using the time-series temperature data.

9. The activity monitoring system of claim 1, further comprising a base station configured to obtain data from the sensor platform and provide the data to the server.

10. The activity monitoring system of claim 1, wherein the animal is a cat.

11. A pet activity monitoring method, comprising:

recording time-series motion data using a sensor platform mounted to an animal's collar, where the sensor platform comprises an inertial measurement unit configured to generate time-series motion data;

receiving the time-series motion data generated by the sensor platform at a server;

classifying the time-series motion data as pertaining to an activity type of an animal using a machine learning model of the server;

generating a message based on the activity type using a natural language processing model of the server;

pushing the message from the server to a user device; and displaying the message using a display of the user device.

12. The pet activity monitoring method of claim 11, further comprising continuously aggregating time-series motion data from the sensor platform;

classifying the aggregated time-series motion data as pertaining to a sequence activity types; and generating the message based on the sequence of activity types.

13. The pet activity monitoring method of claim 11, further comprising selecting the natural language processing model from a plurality of natural language processing models, where each natural language processing model in the plurality of natural language processing models is trained to output text in a different personality.

14. The pet activity monitoring method of claim 11, wherein at least one personality is a veterinarian personality.

15. The pet activity monitoring method of claim 11, wherein at least one personality is a personality type of the animal.

16. The pet activity monitoring method of claim 11, wherein the natural language processing model is a transformer model, and wherein the activity type is provided to the transformer model as an activity token.

17. The pet activity monitoring method of claim 11, further comprising generating a meme image of the animal based on the activity type and an image of the animal using a generative model of the server.

18. The pet activity monitoring method of claim 11, further comprising recording time-series temperature data using a temperature sensor of the sensor platform; and classifying the time-series motion data using the time-series temperature data.

19. The pet activity monitoring method of claim 11, further comprising using a base station to relay data from the sensor platform to the server.

20. The pet activity monitoring method of claim 11, wherein the animal is a cat.

* * * * *